Figure 1:
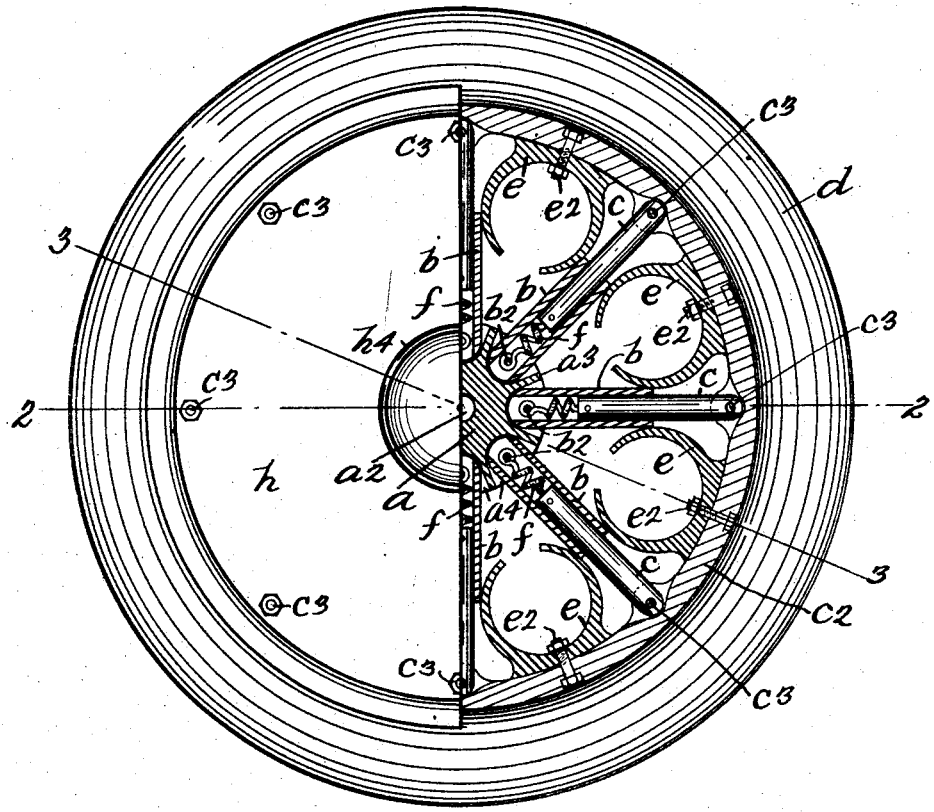

W. Q. KENNEDY.
VEHICLE WHEEL.
APPLICATION FILED JUNE 14, 1907.

905,884.

Patented Dec. 8, 1908.

Witnesses:

Inventor
William Q. Kennedy
By Attorney

UNITED STATES PATENT OFFICE.

WILLIAM Q. KENNEDY, OF NEW YORK, N. Y.

VEHICLE-WHEEL.

No. 905,884.  Specification of Letters Patent.  Patented Dec. 8, 1908.

Application filed June 14, 1907. Serial No. 378,899.

*To all whom it may concern:*

Be it known that I, WILLIAM Q. KENNEDY, a citizen of the United States of America, and residing at New York, in the county of New York and State of New York, have invented certain new and useful Improvements in Vehicle-Wheels, of which the following is a specification, such as will enable those skilled in the art to which it appertains to make and use the same.

This invention relates to automobile or other vehicle wheels and the object thereof is to provide a wheel of this type which is adapted to replace the pneumatic tires, at present employed, by cushion tires; a further object being to provide means whereby impact at any point of the tire is compensated for by the wheel itself and by means of which the said tire is immediately returned to its normal position after impact; a further object being to provide two distinct sets of compensating devices so that, in the event of the derangement or injury of one, perfect operation results from the other and a still further object being to construct a wheel of this type which is simple in construction and repair, positive in operation and comparatively inexpensive.

My invention is fully described in the following specification, of which the accompanying drawings form a part, in which the separate parts thereof are designated by the same reference characters in each of the views, and in which:—

Figure 2:
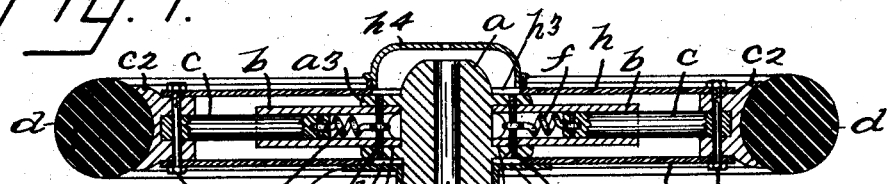
Figure 3:
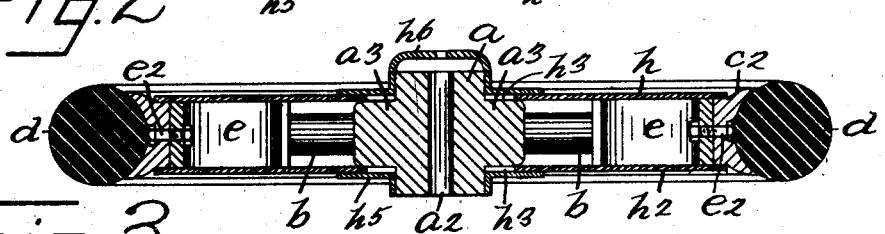

Figure 1 is a front elevation of a vehicle wheel constructed according to my invention and partly in section. Fig. 2 is a section on the line 2—2 of Fig. 1, and Fig. 3 is a section on the line 3—3 of Fig. 1, and showing a modification thereof.

In the drawings forming a part of this application, I have shown a wheel adapted for use in connection with automobiles, bicycles and other vehicles and which comprises a hub $a$ provided with a central bore $a^2$ for the axle and with a flange $a^3$ for the spokes which are mounted in openings $a^4$ in the said flange.

The spokes of my wheel comprise a plurality of tubes $b$, pivotally secured in the openings $a^4$ by means of screws $b^2$, and rods $c$ telescoped therein and pivotally secured in the felly or rim $c$ by means of bolts $c^3$ and the felly $c^2$ carries a cushion tire $d$ of rubber or other suitable material.

Mounted upon the felly $c^2$, between the rods $c$ and bearing on the ends of the tubes $b$, are a plurality of segmental or horse-shoe shaped springs $e$ secured against movement by bolts $e^2$ and, within the tubes $b$, are coil springs $f$ which are secured at their ends to the bolts $b^2$ and to the rods $c$ in such manner as to insure equal and constant strain.

In practice, I also employ front and back dust shields or plates $h$ and $h^2$ each of which is provided with a central opening $h^3$ of a size sufficiently great to permit of extreme movement of the hub $a$ which passes therethrough and the front plate $h$ is covered preferably by means of a detachable cup $h^4$, provided with a lubricating hole if desired, and secured to the said plate $h$, while the opening of the plate $h^2$ is covered by means of a plate $h^5$ secured to the hub $a$ and slidable on the plate $h^2$ thereby permitting movement of the hub $a$ and still preventing dust, dirt or water from entering into the casing formed by the plates $h$ and $h^2$.

In Fig. 3 is shown a slight modification over that just described in that the cup $h^6$, replacing the cup $h^4$, may be connected with the hub $a$ and slide over the plate $h$ in the same manner as the cover $h^5$ of the opening $h^3$ of the plate $h^2$.

In the use of my invention, if impact occur at any point of the tire's periphery, the adjacent spoke or spokes collapse against the spring $f$ at the opposite side of the hub $a$ and extend the springs $f$ in line with said impact, due to the movement of the hub $a$ which is carried in the direction of the impact by the weight of the vehicle, and the force of the said impact is thereby lost upon the vehicle and at the same time the corresponding segmental spring or springs $e$ are collapsed or the ends thereof forced together until the weight of the impact is removed at which time the hub $a$ resumes its normal position due to the two sets of springs $e$ and $f$, said springs being made of sufficient strength for the vehicle upon which my wheel is to be employed.

It will be seen that, because of the bearings of the ends of the springs $f$ and the plurality of directions of the springs $e$, the hub $a$ maintains its normal position under normal conditions and side movement of the hub is prevented because of the fact that the flange $a^3$, felly $c^2$ and springs $f$ all bear against the plates $h$ and $h^2$ which serve as stiffeners therefor as well as for shields.

It will be understood that any number of spokes of this construction may be employed to meet varying conditions and the said spokes may be made of any suitable material and of any desired weight and the shape of the springs f may be modified as well as their method of fastening shown and various other changes in and modifications of the form of construction shown and described may be made without departing from the spirit of my invention or sacrificing its advantages.

Having fully described my invention, what I claim as new and desire to secure by Letters Patent, is:—

1. A vehicle wheel, comprising a hub, a felly, a tire, a plurality of telescopic spokes connecting said hub and felly, and segmental springs secured to said felly between said spokes and bearing upon the ends of one of the members thereof and serving as compensating means for impact on said tire.

2. A vehicle wheel, comprising a hub, a felly, a tire, a plurality of telescopic spring operated spokes connecting said hub and felly and segmental springs secured to said felly between said spokes and bearing upon the ends of one of the members thereof.

3. A vehicle wheel, comprising a hub, a felly, a tire, a plurality of telescopic spokes connecting said hub and felly, segmental springs secured to said felly between said spokes and bearing upon one of the members thereof and plates connected with said felly for holding said spokes and springs in position.

4. A vehicle wheel, comprising a hub, a felly, a tire, a plurality of telescopic spring operated spokes connecting said hub and felly, segmental springs secured to said felly between said spokes and bearing upon the ends of one of the members thereof and plates for holding said springs and spokes in position.

5. A vehicle wheel, comprising a hub, a felly, a tire, a plurality of telescopic spokes and segmental springs secured to said felly bearing against the ends of one of the members of said spokes, the ends of said springs being tapered for varying strength.

In testimony that I claim the foregoing as my invention I have signed my name in presence of the subscribing witnesses this 13th day of June 1907.

WILLIAM Q. KENNEDY.

Witnesses:
H. MOHLAN,
G. MOURATH.